United States Patent [19]

Cooper et al.

[11] Patent Number: 5,116,582
[45] Date of Patent: May 26, 1992

[54] PHOTOCATALYTIC SLURRY REACTOR HAVING TURBULENCE GENERATING MEANS

[75] Inventors: Gerald Cooper, Boulder; Matthew A. Ratcliff, Lakewood; Jeffrey G. Sczechowski, Boulder, all of Colo.

[73] Assignee: Photo-Catalytics, Inc., Boulder, Colo.

[21] Appl. No.: 514,557

[22] Filed: Apr. 26, 1990

[51] Int. Cl.⁵ .............................................. B01J 19/12
[52] U.S. Cl. .................................. 422/186.3; 422/24; 422/186
[58] Field of Search .................. 204/157, 15; 422/186, 422/186.01, 186.03, 24, 186.07, 186.3

[56] References Cited

U.S. PATENT DOCUMENTS

| | | | |
|---|---|---|---|
| 4,189,363 | 2/1980 | Beitzel | 204/157.1 R |
| 4,214,962 | 7/1980 | Pincon | 204/157.1 R |
| 4,437,954 | 3/1984 | Sammells et al. | 204/129 |
| 4,770,858 | 9/1988 | Collins | 422/186.18 |
| 4,888,101 | 12/1989 | Cooper | 204/157.15 |

Primary Examiner—Edward A. Miller
Assistant Examiner—Daniel J. Jenkins
Attorney, Agent, or Firm—Ralph F. Crandell

[57] ABSTRACT

A photocatalytic slurry reactor is driven by solar or artificial ultraviolet illumination. A cylindrical ultraviolet lamp is suspended by an O-ring within a cylindrical reactor jacket, creating an annular region through which a photocatalytic slurry is pumped. An optional streamlined nose cone at the inlet end of the lamp reduces flow turbulence and increases flow velocity. A helical stainless steel wire wrapped about the bulb acts as a turbulence promotor to disturb the boundary layer for increased radial mixing. A three-electrode charging-arrangement may be used to regulate the charge of the solution. In another embodiment, a reactor uses a solar collection trough to focus solar rays on a C-shaped reactor jacket, the interior of which is provided with ridges or ribs to disturb the boundary layer.

7 Claims, 4 Drawing Sheets

Fig. 1

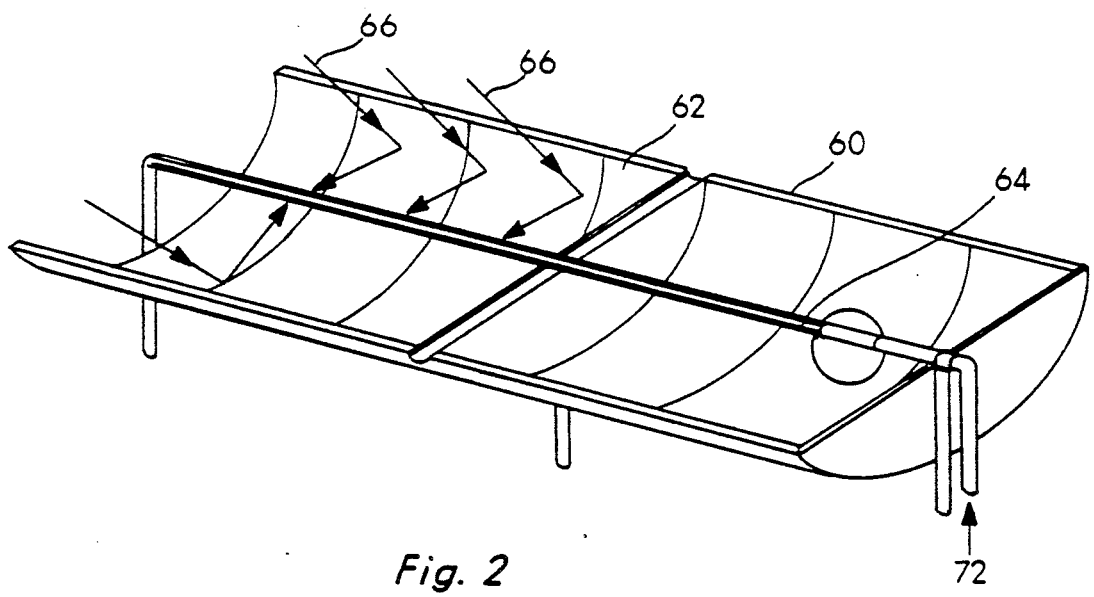
Fig. 2
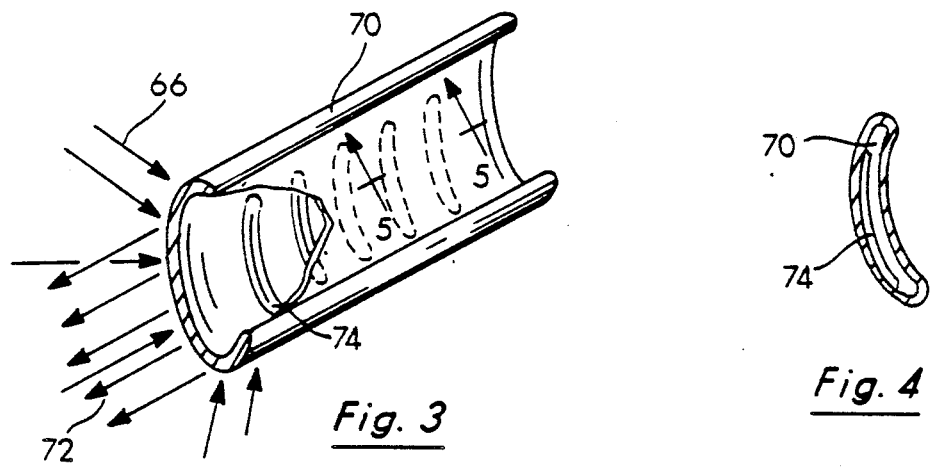
Fig. 3
Fig. 4
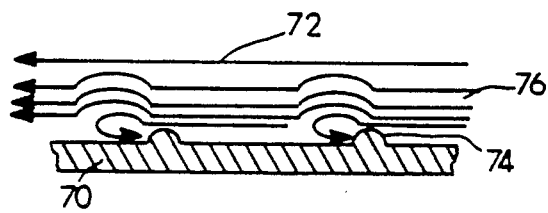
Fig. 5

PHOTOCATALYTIC SLURRY REACTOR HAVING TURBULENCE GENERATING MEANS

BACKGROUND OF THE INVENTION

1. Field of the Invention

This application relates to photocatalytic slurry reactors, and more particularly, to photocatalytic slurry reactors designed to achieve high quantum yield photocatalytic reactions when driven by solar or artificial illumination.

2. Description of the Prior Art

Catalytic reactions have long been used for purification of industrial and other types of waste. Photocatalysis is distinguishable from ordinary heterogeneous catalysis by its use of visible and ultraviolet radiation to facilitate chemical reactions. Ordinary heterogeneous catalysis typically uses thermal energy to facilitate its chemical reactions. In ordinary catalysis, thermal energy derived from infrared radiation, direct heating, or even microwave absorption manifests itself as an elevated temperature of the chemical reactants and the catalyst for the provision of the reactant's activation energy. The optical properties of the catalyst are not germane to this process. The catalyst is optically passive, and only provides an adsorbing surface for diminishing the activation energy of reactants. In distinction from ordinary catalysis, in heterogeneous photocatalysis, the catalyst's optical properties are paramount; the photocatalyst must be a semiconductor. By absorption of band-gap light, electron and hole charge carrier pairs are produced within the photocatalyst particles. These charge carriers then perform redox reactions with the chemical species. Thus, the distinguishing feature of photocatalytic reactions is that the activation energy of reaction results primarily from optical processes rather than from simple heating.

Photocatalysis has been used successfully by employing irradiated semiconductor powders to decompose organic molecules in an aqueous solution. Typically this process involves passing the solution and the photocatalyst through a reactor in which they are exposed to light radiation. One of the most important considerations in photocatalytic reactor design is the optimal use of all the light entering the reactor. The avoidance of light wastage is important because artificial generation of UV light is electrical energy intensive, and therefore expensive. Even where solar light is used, the land surface area involved may be costly, and over-sizing of reactors may be necessary to compensate for poor insolation in certain geographic areas.

In artificially illuminated reactors, the irradiating light is transmitted through a transparent reactor wall to the slurry. As the liquid slurry flows past this wall, a stagnant boundary layer of fluid is disposed close to the wall. The thickness of the boundary layer plays an important part in the design of photocatalytic reactors, because of the small penetration depth of the irradiating light. For example, if the boundary layer is comparable in thickness to the penetration depth of the light, a considerable portion of the light can be wasted. This greatly reduces the overall quantum yield of this system, where quantum yield is defined as the number of contaminant molecules decomposed per second divided by the number of band-gap photons entering the reactor per second in the initial part of the reaction.

As the slurry passes along the transparent wall, the contaminants which are adsorbed on the photocatalyst particles are decomposed. If the boundary layer occupies a considerable portion of the light penetration depth, the particles will be depleted of the adsorbed contaminants, yet they will continue to absorb light. The particles will remain trapped in this slow moving boundary layer since there is little interchange of matter between the boundary layer and the bulk of the fluid. The light entering this boundary layer is thus wasted after the particles are depleted of their adsorbed contaminants. The overall effect is known as a mass transfer limitation. To avoid this problem, the reactor must be designed to minimize the boundary layer thickness.

The boundary layer characteristics associated with fluid flow through a tube approximate those associated with fluid flow through an annulus. It is a widely accepted fact based on the work of Deissler and Prandtl that the effective thickness of the boundary layer decreases with an increase in the linear velocity of the fluid in the tube. Deissler developed equations that can be used to determine the size of the two regions which make up the boundary layer in turbulent flow, the viscous sublayer and the buffer zone. The viscous sublayer is a very slow moving layer of fluid which is mathematically described in the same fashion as the laminar boundary layer. The buffer zone is the area in transition between the viscous sublayer and the turbulent bulk flow. Using Deissler's equations we can predict the thickness of these two regions in a tube for various linear fluid velocities through the tube. At a velocity of 0.25 meters/second the total thickness of these two regions is calculated to be approximately 1.5 mm. From a light penetration study described in U.S. patent application Ser. No. 07/451,375, filed Dec. 15, 1989, for "APPARATUS FOR PHOTOCATALYTIC TREATMENT OF LIQUIDS," it was found that 77% of the light irradiating the slurry was absorbed within a 1.5 mm. thickness from the surface boundary. In this case, most of the light will be wasted since it is absorbed by semiconductor particles in the stagnant boundary layer which is not replenished quickly with chemicals or microbes to be modified. This condition leads to a mass transfer limitation problem. If the linear velocity through the tube is increased to 3 meters/second, the total thickness of these two regions (viscous sublayer and buffer zone) is reduced to 0.17 mm. Within the 0.17 mm. thickness only 15% of the incoming light is absorbed, the remainder being transmitted into the bulk turbulent flow where it continually illuminates catalyst with adsorbed contaminants. However, the advantages of decreasing the boundary layer thickness by inducing turbulent flow as a result of increased linear velocity of the fluid through the reactor may be offset to some extent by the increased energy costs associated with producing the increased velocity.

The data presented below in Table 1 represents the photocatalytic decomposition of trichloroethylene (TCE) in various reactors. TCE was chosen as a model compound because its very fast decomposition kinetics pose a challenge to proper reactor design through avoidance of mass transport limitation. The data in Table 1 illustrates the importance of proper reactor design. The quantum yield set forth in Table 1 is the measurement of reactor's ability to utilize incident radiation to decompose the aqueous organic contaminant, TCE, and is defined as the number of TCE molecules decomposed per second divided by the number of band-gap photons entering the reactor per second during the initial part of the reaction.

In experiments nos. 1 through 5 shown in Table 1, obtained by employing a recirculating front illuminated reactor and using several different light sources, an average quantum yield of 0.329 was obtained for the decomposition of 100 ppm TCE. Although this reactor has exhibited the highest quantum yield to date of any reactor the inventors have tested, the reactor possesses an impractical configuration for scale-up. It is used primarily as reference standard in the laboratory for comparing the efficiencies of other reactor designs.

By wrapping the light envelope, i.e., the inner wall of the annular space with a helix of 0.02 in. stainless steel wire in accordance with the present invention (FIG. 1) a further improvement to the quantum yield of 0.130 was obtained (experiment no. 8). In similar experiments using a 38 mm. reactor without and with wire helix, quantum yields of 0.112 and 0.123 were obtained, respectively (experiments nos. 9 and 10). These annular reactor designs are about one-third the efficiency of the front-illuminated reactor and about 1.6–2.2 times more efficient than the annular cyclonic reactor in experiment 6.

In experiments nos. 8 and 10, additional 37% and 10% improvements in quantum yield were obtained by inserting a stainless steel wire helix. The principal purpose of the wire is to create turbulent zones and therefore better mass transfer precisely in the photoactive region. Experiments performed with concentric 2-3 mm. thick boundary layer turbulence promoters (BLTPs) such as the wire helix in the outer annular wall did not cause significant quantum efficiency increases. The BLTPs on the inner annular wall do not have to be helical or made from wire to be effective. Concentric rings or other rugosities on the inner annular wall should impart the same effect.

| COMPILATION OF PHOTOCATALYTIC DECOMPOSITION OF 100 ppm TCE DATA IN VARIOUS REACTORS | | |
|---|---|---|
| TEST NO. | REACTOR TYPE | QUANTUM YIELD |
| 1 | Front Illuminated | 0.253 |
| 2 | Front Illuminated | 0.263 |
| 3 | Front Illuminated | 0.452 |
| 4 | Front Illuminated | 0.335 |
| 5 | Front Illuminated | 0.196 |
| 6 | Annular (Cyolonio) | 0.060 |
| 7 | Annular (35 mm no wire) | 0.095 |
| 8 | Annular (35 mm ss wire) | 0.130 |
| 9 | Annular (38 mm no wire) | 0.112 |
| 10 | Annular (38 mm ss wire) | 0.123 |
| 11 | Annular (35 mm ss wire −1.5 V) | 0.157 |
| 12 | Annular (35 mm ss wire +1.5 V) | 0.124 |
| 13 | Annular (38 mm ss wire −0.2 V) | 0.140 |

A further consideration in a reactor design are entrance effects. When a fluid enters a tube it requires a certain distance to build a fully developed flow pattern. For turbulent flow in a tube this distance is approximately 52 diameters. For a 2 cm. tubular reactor, the turbulent flow would thus be fully developed at 1 meter.

In experiments nos. 7 and 9, the significantly improved quantum yields were due to a decreased thickness of the stagnant boundary layer at the illuminated surface resulting from the increased fluid velocity through the annulus. Since identical pumps were employed in all the experiments described above (except for the CSTR), the enhanced velocity obtained is assisted by a specially designed entrance nozzle.

Still another consideration in a reactor design is that finely dispersed particles in the aqueous phase can accumulate an electrical charge of either positive or negative polarity. The surface charge of a particle is determined by the preferential adsorption of various ions present in solution. In the case of band-gap illuminated semiconductor particles, there is another mechanism by which the charge state of the particles may be altered. An illuminated semiconductor particle produces electron (negative charge)/hole(positive charge)pairs. One of the results of charging is a shift in the flat-band potential of the semiconductor particle, i.e., the energy levels of the conduction and valence bands are altered. A change in the relative positions of the band edge positions with respect to the redox coupled energies will alter reaction rates and can even preclude reactions from occurring. Additionally, photocatalytic reactions can strongly depend on the ability of solution redox species to adsorb on the particle's surface. The charge state of the photocatalyst particles can thus influence adsorption rates, and therefore reaction rates.

The results with the charger/BLTP are tabulated in Table 1 as experiments nos. 11, 12 and 13. For the 35 mm. annular reactor, applying a −1.5 V potential to the charger/BTLP (experiment no. 11) resulted in a quantum yield increase to 0.157 in comparison to a 0.130 quantum yield for experiment 8 performed without a potential applied to the charger/BLTP. This represents a 21% increase in quantum yield by applying a negative charge to the slurry. By applying a +1.5 V potential to the charger/BTLP, the quantum yield was diminished to 0.124 or by 5% (experiment no. 12). Although the positive charging decreased the reaction rate in comparison to the uncharged wire, the rate was still faster than if the BLTP wire helix was absent (see experiment no. 7). For the 38 mm. reactor, applying a −0.2 V potential under potentiostatically controlled conditions (a third platinum wire screen employed as a reference electrode) (see experiment no. 13) yielded a quantum yield of 0.140. This represents a 14% increase in the quantum yield over experiment no. 10, in which no potential was applied to the charger/BLTP.

SUMMARY OF THE INVENTION

In accordance with the present invention, a photocatalytic slurry reactor is provided which includes an tubular UV transparent jacket having a ultraviolet light source suspended therein and a outer wall sealed to the jacket by use of an O-ring. An annular region is thus created between the ultraviolet transparent jacket and the reactor outer wall. Photocatalyst slurry is pumped into this annular region, where a photocatalytic reaction takes place upon illumination. An optional nose cone may be provided on the end of the ultraviolet light transparent jacket nearest the reactor inlet to allow for streamlined entry of the slurry as it is introduced into the annular region. Alternatively, the jacket itself may be fabricated so that it is streamlined at the end where fluid is entering the annulus. By streamlining and thereby minimizing entrance back pressure at the unilluminated entrance, energy costs are reduced and faster flow of the slurry is made possible. As a general rule, the greater the flow velocity, the lesser will be the boundary layer thickness. Optionally, three spaced nose cone stabilizers may be provided which bridge the gap between the nose cone and the reactor jacket, further stabilizing the position of the UV transparent jacket within the reactor outer wall.

In order to further alleviate mass transfer limitation problems, the turbulence in the boundary layer of fluid is increased by use of a boundary layer turbulence promotor. For example, a coil of stainless steel wire is helically wrapped around the ultraviolet transparent jacket. This wire coil boundary layer turbulence promoter helps to reduce boundary layer problems in two ways. First, it disrupts the boundary layer by generating wakes and eddies along the surface of the ultraviolet light transparent jacket, thereby increasing the radial mixing along that surface. The turbulence device also acts to force the transition from laminar flow to turbulent flow in the illuminated region of the reactor by reducing the entrance effects, discussed above. Still further, generation of turbulence by the turbulence device serves to increase convective mixing, and thus improves quantum yield of reactive material.

After passing through the reactor, the slurry exits through the reactor outlet and is recirculated back through the system until the reactions are complete, at which point the entire slurry may be drawn off through an exhaust valve.

To further improve the efficiency of the reaction, solution particles may be charged by an arrangement of three electrodes, using the turbulence device in a dual role as a working electrode (i.e., charger). For best results, the turbulence device will be located in the illuminated region where the greatest photoelectrochemical activity occurs. A platinum screen is used as a measuring electrode in the three electrode system. The platinum screen serves to measure the slurry's state of charge, rather than actively charging the slurry. Finally, a third counter electrode is isolated chemically (mass transfer prohibited) from the main reactor and includes a platinum screen immersed in an electrolyte and separated from the main reactor via a Nafion membrane. The Nafion membrane allows the flow of H+ ions necessary for the maintenance of system charge neutralization. Charging potential is applied between the BLTP and the counter electrodes. The polarity of the charging depends on the nature of the reaction. Test results employing this three electrode arrangement have demonstrated approximately a 20% increase in quantum yield as compared with reactors performing without the three electrode system.

In another embodiment of the present invention, a parabolic solar trough is used to focus the sun's rays on a ultraviolet light transparent reactor through which slurry is passed. Improved results are obtained by using a reactor jacket having a "C" shaped cross-section. This C-shaped reactor jacket decreases boundary layer thickness and exposes a relatively greater percentage of the slurry to light, compared to a reactor jacket having a cylindrical configuration. This serves to enhance the quantum yield of the reaction. As with the earlier embodiment, turbulence devices are employed to disturb the boundary layer. Alternatively, a UV transparent tubular reactor may be fitted with turbulence devices or static in-line mixers to reduce the boundary layer thickness by turbulence flow generation.

Additional advantages of this invention will become readily apparent from the description which follows, together with the accompanying drawings.

BRIEF DESCRIPTION OF THE DRAWINGS

FIG. 2 is a partial perspective view of the solar collecting trough reactor of the present invention, showing the reactor jacket running lengthwise along the focal point of the solar collector;

FIG. 3 is a partially cut away perspective view of the C-shaped reactor jacket showing the boundary layer turbulence promoter, the flow of the slurry through the jacket, and the solar rays impending thereupon;

FIG. 4 is an end cross-sectional view of the C-shaped reactor jacket showing the boundary layer turbulence promoters;

FIG. 5 is a cross-sectional view taken along Line 5—5 of FIG. 3, showing the boundary layer turbulence promoters acting upon the boundary layer in the flow of the slurry;

DESCRIPTION OF A PREFERRED EMBODIMENT

Figure 1:
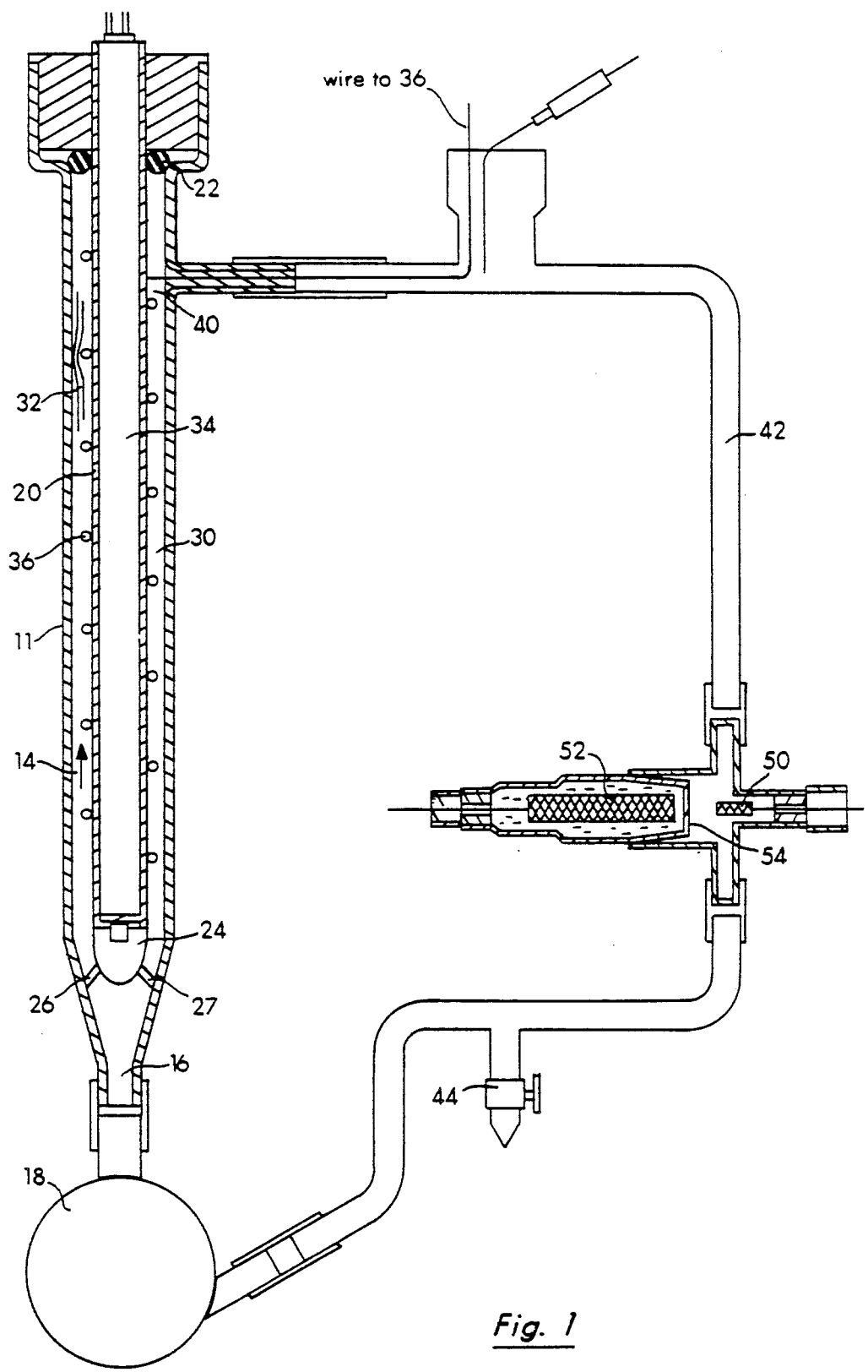
FIG. 1 is a side partial cross-sectional view of the annular reactor of the present invention, showing the ultraviolet light bulb, ultraviolet light transparent jacket, reactor outer wall, and boundary layer turbulence promoters, as well as the three electrode charging system.

Referring now to FIG. 1, there is shown an annular reactor 10 in accordance with the present invention. The reactor 10 includes a cylindrical reactor outer wall 11 having an upper end 12 and a lower end 13. A slurry 14 enters through the inlet 16 located at the lower end 12, with flow being generated by a pump 18. For best results, the pump 18 will have a capacity of at least 24 cubic feet per minute. A cylindrical ultraviolet light transparent jacket 20 is suspended within the reactor outer wall 11 by an O-ring 22, located at the upper end 12 of the reactor outer wall 11.

Optional streamlined nose cone 24 is provided at the lower end of the ultraviolet light transparent jacket 20 near inlet 16. Within the ultraviolet light transparent jacket 20, an ultraviolet light bulb 34 is suspended. Three nose cone stabilizers 26, 27, and 28 (only two of which are shown) buttress the nose cone 24 to the reactor outer wall 11, to further add to stability of the UV transparent jacket 20 under flow conditions. For best results, nose cone stabilizers 26, 27 and 28 will be evenly spaced at 120 degree intervals around the nose cone 24. The overall effect of the nose cone is to minimize resistance by allowing streamlined entry of the slurry 14 as it flows into the inlet 16. The nose cone thereby helps to reduce energy costs, since the flow resistance results in wasted energy. In addition, by minimizing entrance back pressure, the nose cone 24 allows for a higher flow velocity of slurry 14. Since a higher flow velocity results in turbulent flow which in turn provides a thinner boundary layer, this has the advantageous effect of optimizing quantum yield.

The arrangement of the ultraviolet light transparent jacket 20 within the reactor outer wall 11 creates an annular flow region 30 therebetween through which the slurry 14 flows. The thickness of the annular flow region 30 is of importance since narrowing the flow region will result in a relative decrease in the thickness of the boundary layer and an increase in the flow velocity, but will decrease the flow volume and increase the relative expense of pumping. A wider flow region 30, on the other hand, will have the converse effects. Tests have shown that an optimum flow region thickness for an annular reactor length of approximately 1 meter will be on the order of approximately 0.3–0.5 centimeters.

As the slurry 14 flows through the annular flow region 30, a boundary layer 32 is created along the surface of the jacket 20. This boundary layer 32 reduces quantum efficiency by creating mass transfer limitations, as discussed above. In order to alleviate this problem, a rugosity or turbulence increasing device such as a baffle or boundary layer turbulence promoter 36 is provided, in the flow region 30, one form of turbulence device shown in FIG. 1 is a helical coil of stainless steel wire or other inert relatively rigid material wrapped around the external surface of the ultraviolet light transparent jacket 20.

Figure 6:
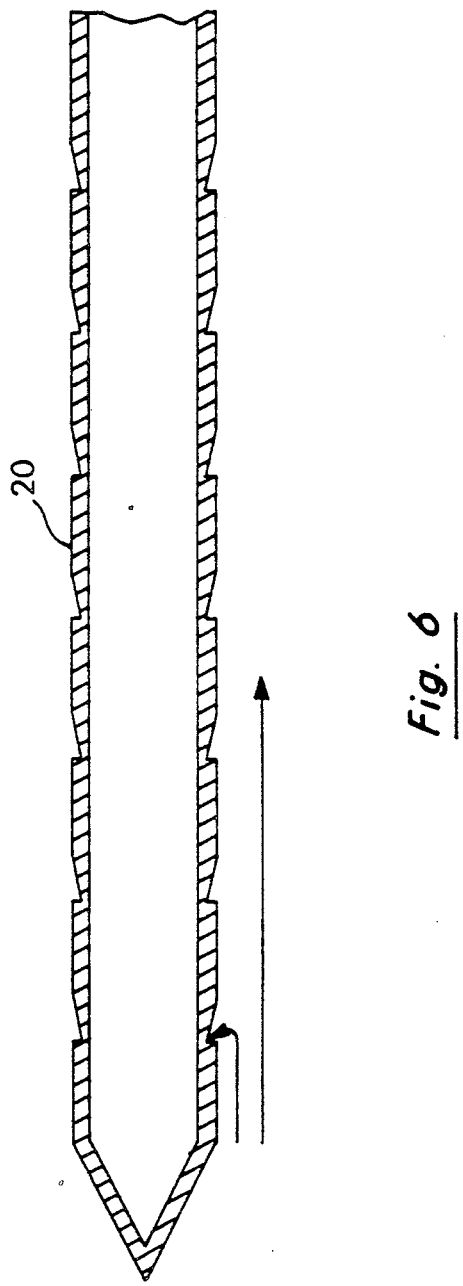
FIG. 6 is a side view of the UV transparent jacket incorporating surface discontinuities as a form of BLTP's.
Figure 7:
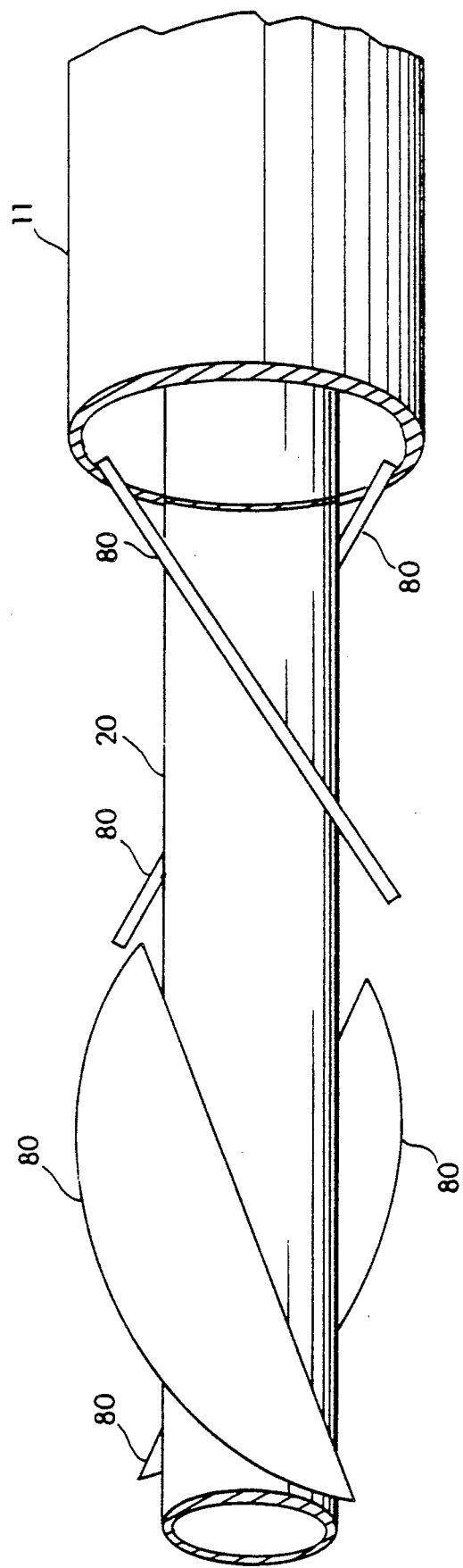
FIG. 7 is a side view of static in-line mixers installed in the annular space of the reactor.

Another form of a turbulence device is a series of steps or discontinuities along the UV transparent jacket as shown in FIG. 6. These discontinuities may be formed, for example, by etching or grinding the surface of the UV transparent jacket. Yet another form of turbulence device is composed of static in-line mixers included within the annular region as shown in FIG. 7. Such static in-line mixers may comprise fins 80 affixed to the UV transparent jacket, such as with an adhesive, and oriented at an angle to the fluid flow. Similar fins have been used to generate fluid turbulence within tubes, but in different environments and for different fluids. These in-line mixers may require an increase in the annular spacing to offset the back pressure increase they will cause and to allow space for their installation.

The boundary layer turbulence promotor 36 helps to reduce boundary layer problems in two ways. First, it disrupts the boundary layer by generating wakes and eddies along the smooth UV transparent jacket 20, which increases the radial mixing within the boundary layer. This phenomenon can actually be seen in the chaotic movement of small air bubbles trapped in the fluid flow. The boundary layer turbulence promoter 36 also acts as a "trip" which forces the transition from a laminar flow to a turbulent boundary layer, thus reducing the entrance effects discussed above. By disrupting the initial development of a laminar boundary layer, the turbulence device thus allows a thin turbulent boundary to develop near the entrance 16 of the annular region 30, further reducing mass transfer limitations and allowing a higher quantum yield.

In addition, a high quantum yield, specific for a given reactant, is achieved by convective mixing through the generation of turbulence. As described above, most of the photochemistry effects will occur within a very narrow region on the order of 0.1 cm. near the jacket 20. Therefore, as reactants are depleted in this narrow region they must be replaced by fresh material if the incident radiation is not to be wasted (i.e., if high quantum yields are to be obtained). By contrast, if the reactor 10 is allowed to have a significantly thick boundary layer 32 near the wall 30, then the only mechanism by which fresh material can enter the photoactive region is diffusion. Under this condition, for reactants with rapid kinetics such as trichloroethylene, mass transport limitation can occur, thereby wasting light energy.

After passing through the reactor 10, the catalyst slurry 14 exists through reactor outlet 40 and enters recirculating pipe 42 through which it is recycled back into the pump 18. Periodically, samples of the slurry 14 may be drawn off through exhaust valve 44, and upon completion of the catalysis, the entire slurry will be drawn off through exhaust valve 44.

To further improve the quantum yield of the reaction, charging of solution particles may be provided by an arrangement of three electrodes. For this purpose, it is found to be efficient to have the turbulence device 36 double as a working electrode or charger. The working electrode turbulence device 36 is made out of less expensive stainless steel wire, although it could be made from platinum or other non-corrodible metals. For best results, the turbulence device 36 is placed directly in the region of greatest photoelectrochemical activity, the illuminated region 30. Advantageously, the working charger's action as a turbulence promoter ensures more efficient collisions of particles with the charger 36. Additionally, since it is located in the illuminated region 30, the working charger 36 can mitigate charge buildup arising from photoelectrochemical redox reactions, as the reactions are occurring in the boundary layer mix zone, i.e., immediately, rather than charging the particles in the dark followed by the movement to the illuminated region 30.

A platinum screen 50 may be employed as a measuring or detector electrode. Rather than being employed to actively charge the slurry 14, the platinum screen 50 serves to measure the slurry's state of charge. Certain photoelectrochemical reactions have a characteristic charge "fingerprint". Often the end-point of a reaction can be determined in real time, analogous to the end-point in a titration. For reactions with a well characterized "fingerprint", this method may be used rather than more complex and time consuming conventional analytical procedures.

Finally, a third counter electrode 52, isolated electrically from the main reactor 10, comprises a platinum screen immersed in 0.1 M KCL or other electrolyte and separated from the main reactor 10 via a Nafion membrane 54. The membrane 54 permits the flow therethrough of H+ ions necessary for the maintenance of system charge neutralization. The charging potential is applied between the stainless steel wire 36 and the counter electrode 52. Test results employing this three-electrode arrangement demonstrated approximately a 20% increase in quantum yield as compared with reactors performing without a potential applied to the charger/BLTP 36.

Referring now to FIGS. 2 through 5, there is shown a reactor 60 utilizing a different embodiment of the same principles of the present invention. The reactor 60 includes a parabolic solar trough 62 having a reactor jacket 64 disposed at the focal point of the sun's rays 66. Solar troughs typically concentrate sunlight by a factor of approximately 20. This corresponds to a usable photon flux, for wave lengths shorter than about 380 nm, of about $10 \times 10^{20}$ photons/sec/m². This is approximately three times greater than obtained with the very intense low pressure artificial light sources employed in the annular reactor 10 previously described. This higher photon flux associated with the reactor 60 magnifies mass transport problems. Therefore, at the even higher intensities expected with the solar trough concentrators, mass transport and boundary layer problems are even more exaggerated. A typical configuration of a photocatalytic slurry reactor jacket for parabolic troughs is a transparent cylindrical pipe. An improvement in quantum yield may be obtained via reducing boundary layer thickness by the installation of static in-line mixers to promote turbulent flow. If the static in-line mixers are constructed of stainless steel or some other non-corrodible, conductive material, they may double as a working electrode or charger in a three electrode system as described above. Extending the concepts learned from the annular reactor, turbulence devices can be similarly employed in cylindrical pipe reactors. This would be done by inserting spiral or concentric ring inserts into the pipe, rather than in-line mixers.

Alternatively, improved results may be obtained by using a "C" shaped cross-section reactor jacket 70, as depicted in FIGS. 3 and 4. This C-shaped reactor jacket 70 exposes a much greater percentage of the slurry 72 flowing therethrough to direct sunlight than does a reactor jacket having a cylindrical configuration. In addition, the normal cross-section has the advantage of the thin annular space of the artificially illuminated reactor described above, i.e., minimizing the boundary layer thickness. As with the earlier described reactor 10, a turbulence device 74 may be advantageously employed to disturb the boundary layer 76, as discussed above. The turbulence device may be created such as by incorporating a series of spaced ridges, steps or ribs along the interior wall of the jacket 70.

Although particular embodiments of the present invention have been described and illustrated herein, it should be recognized that modifications and variations may readily occur to those skilled in the art and that such modifications and variations may be made without departing from the spirit and scope of our invention. Consequently, our invention as claimed below may be practiced otherwise than as specifically described above.

We claim:

1. A reactor for carrying out a photocatalytic reaction in a photocatalytic slurry, said reactor comprising an elongated cylindrical reaction chamber having an axially aligned inlet for receiving at-least-partially unreacted photocatalytic slurry and an outlet for discharging at-least-partially reacted photocatalytic slurry, a conduit connecting said inlet and said outlet externally of said chamber, means defining an inlet port in said conduit for introducing unreacted photocatalytic slurry into said chamber and conduit, means defining an outlet port for withdrawing reacted photocatalytic slurry from said chamber and conduit, a pump intermediate said chamber inlet and said conduit for circulating photocatalytic slurry through said conduit and said chamber, an ultraviolet light source mounted axially within said chamber and having an external surface defining therewith an annular reaction flow passage, a conductive wire helically wrapped around the external surface of said light source for increasing the turbulence in the boundary layer of the stream of photocatalytic slurry flowing through said annular chamber around said light source, means for charging said wire with an electrical charge, a counter-electrode in said conduit for supplying hydrogen ions to said slurry for maintaining the electrical charge therein, and a charge detecting and measuring electrode in said conduit for measuring the state of charge of said slurry and controlling electrical charge applied to said slurry by said conductive wire to increase and control the quantum yield of reaction product produced in said slurry.

2. A reactor as defined in claim 1 wherein the end of said light source adjacent said inlet is streamlined to define a nose cone.

3. A reactor as defined in claim 2 including support members interposed between said nose cone and said reactor chamber for supporting said light source therein.

4. A reactor for carrying out a photocatalytic reaction in a photocatalytic slurry, said reactor comprising an elongated cylindrical reaction chamber having an axially aligned inlet for receiving at-least-partially unreacted photocatalytic slurry and an outlet for discharging at-least-partially reacted photocatalytic slurry, a conduit connecting said inlet and said outlet externally of said chamber, means defining an inlet port in said conduit for introducing unreacted photocatalytic slurry into said chamber and conduit, means defining an outlet port for withdrawing reacted photocatalytic slurry from said chamber and conduit, a pump intermediate said chamber inlet and said conduit for circulating photocatalytic slurry through said conduit and said chamber, an ultraviolet light source mounted axially within said chamber and having an external surface defining therewith an annular reaction flow passage, means on the external surface of said light source for increasing the turbulence in the boundary layer of the stream of photocatalytic slurry flowing through said annular chamber around said light source, said turbulence increasing means comprising a conductive wire coil inside said reaction chamber, said wire coil being electrically conductive and connected to a source of electric current for carrying an electrical charge to said slurry, the end of said light source adjacent said inlet defining a streamlined nose cone, and means interposed between said nose cone and said reaction chamber for supporting said light source therein.

5. A reactor as defined in claim 4 including means for measuring and modifying the electrical charge state of said photocatalytic slurry.

6. A reactor for carrying out a photocatalytic reaction in a photocatalytic slurry, said reactor comprising an elongated C-shaped ultraviolet light transparent cylindrical reaction chamber having an inlet for receiving at-least-partially unreacted photocatalytic slurry and an outlet for discharging at-least-partially reacted photocatalytic slurry, a conduit connecting said inlet and said outlet externally of said chamber, means defining an inlet port on said conduit for introducing unreacted photocatalytic slurry into said chamber conduit, means defining an outlet port for withdrawing reacted photocatalytic slurry from said chamber and conduit, a pump intermediate said conduit and said chamber inlet for circulating photocatalytic slurry through said chamber and conduit, a turbulence promotor within said reaction chamber, said turbulence promotor comprising a conductive wire coil inside said reaction chamber, said wire coil being electrically conductive and connected to a source of electric current for carrying an electrical charge to said slurry, a parabolic solar collecting trough, and means supporting said reactor axially along the focal line of said trough, whereby ultraviolet solar energy is collected by said trough and focused on said reactor to effect a photochemical reaction in said photocatalytic slurry.

7. A reactor as defined in claim 6 including means for measuring and modifying the electrical charge state of said photocatalytic slurry.

* * * * *